(12) United States Patent
Shah et al.

(10) Patent No.: US 11,533,667 B2
(45) Date of Patent: Dec. 20, 2022

(54) USER EQUIPMENT AND BASE STATION PARTICIPATING IN RADIO ACCESS NETWORK UPDATE PROCEDURE

(71) Applicant: Panasonic Intellectual Property Corporation of America, Torrance (CA)

(72) Inventors: Rikin Shah, Langen (DE); Hidetoshi Suzuki, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 56 days.

(21) Appl. No.: 16/486,957

(22) PCT Filed: Feb. 22, 2018

(86) PCT No.: PCT/EP2018/054349
§ 371 (c)(1),
(2) Date: Aug. 19, 2019

(87) PCT Pub. No.: WO2018/172013
PCT Pub. Date: Sep. 27, 2018

(65) Prior Publication Data
US 2021/0136649 A1  May 6, 2021

(30) Foreign Application Priority Data
Mar. 24, 2017 (EP) .................................. 17162849

(51) Int. Cl.
*H04W 36/32* (2009.01)
*H04W 36/00* (2009.01)
(Continued)

(52) U.S. Cl.
CPC ....... *H04W 36/32* (2013.01); *H04W 36/0038* (2013.01); *H04W 36/14* (2013.01);
(Continued)

(58) Field of Classification Search
CPC . H04W 36/32; H04W 36/0038; H04W 36/14; H04W 76/11; H04W 76/27; H04W 74/0833; H04W 80/02
See application file for complete search history.

(56) References Cited

U.S. PATENT DOCUMENTS

2016/0366704 A1    12/2016 Lee et al.
2018/0234890 A1*   8/2018 Shih ...................... H04W 12/04
(Continued)

FOREIGN PATENT DOCUMENTS

RU        2 446 637 C2    3/2012

OTHER PUBLICATIONS

3GPP TR 38.801 V2.0.0, "3rd Generation Partnership Project; Technical Specification Group Radio Access Network; Study on New Radio Access Technology; Radio Access Architecture and Interfaces (Release 14)," Mar. 2017, 90 pages.
(Continued)

*Primary Examiner* — Candal Elpenord
(74) *Attorney, Agent, or Firm* — Seed IP Law Group LLP

(57) ABSTRACT

The present disclosure relates to a user equipment in a mobile communication system. The UE comprises processing circuitry, which determines whether the UE, being located in a first radio access network notification area, first RNA, is moving to a second radio access network notification area, second RNA, different from the first RNA. The UE is in an inactive state out of an idle state, a connected state and the inactive state the user equipment can be in. The UE further comprises a transmitter, which transmits identification information on the first RNA to a second radio base station of the second RNA, when determining that the UE is moving to the second RNA. The UE further comprises a receiver which receives from the second radio base station UE related context information usable by the UE to
(Continued)

exchange uplink and downlink data with the second radio base station.

19 Claims, 8 Drawing Sheets

(51) Int. Cl.
  *H04W 36/14* (2009.01)
  *H04W 74/08* (2009.01)
  *H04W 76/11* (2018.01)
  *H04W 80/02* (2009.01)
  *H04W 76/27* (2018.01)

(52) U.S. Cl.
  CPC ........ *H04W 74/0833* (2013.01); *H04W 76/11* (2018.02); *H04W 76/27* (2018.02); *H04W 80/02* (2013.01)

(56) References Cited

U.S. PATENT DOCUMENTS

| | | | | |
|---|---|---|---|---|
| 2018/0270713 | A1* | 9/2018 | Park | H04W 74/0833 |
| 2018/0270791 | A1* | 9/2018 | Park | H04W 76/27 |
| 2018/0279193 | A1* | 9/2018 | Park | H04W 36/08 |
| 2019/0357091 | A1* | 11/2019 | Jin | H04L 5/0055 |
| 2020/0068646 | A1* | 2/2020 | Kwon | H04W 68/02 |

OTHER PUBLICATIONS

3GPP TR 38.804 VI.0.0, "3rd Generation Partnership Project; Technical Specification Group Radio Access Network; Study on New Radio Access Technology; Radio Interface Protocol Aspects (Release 14)," Mar. 2017, 56 pages.
3GPP TR 38.913 V14.1.0, "3rd Generation Partnership Project; Technical Specification Group Radio Access Network; Study on Scenarios and Requirements for Next Generation Access Technologies; (Release 14)," Dec. 2016, 38 pages.
3GPP TS 36.321 V14.1.0, "3rd Generation Partnership Project; Technical Specification Group Radio Access Network; Evolved Universal Terrestrial Radio Access (E-UTRA); Medium Access Control (MAC) protocol specification (Release 14)," Dec. 2016, 98 pages.
3GPP TS 36.323 V14.2.0, "3$^{rd}$ Generation Partnership Project; Technical Specification Group Radio Access Network; Evolved Universal Terrestrial Radio Access (E-UTRA); Packet Data Convergence Protocol (PDCP) specification (Release 14)," Mar. 2017, 43 pages.
3GPP TS 36.331 V14.1.0, "3$^{rd}$ Generation Partnership Project; Technical Specification Group Radio Access Network; Evolved Universal Terrestrial Radio Access (E-UTRA); Radio Resource Control (RRC); Protocol specification (Release 14)," Dec. 2016, 654 pages.
3GPP TS 36.413 V14.1.0, "3$^{rd}$ Generation Partnership Project; Technical Specification Group Radio Access Network; Evolved Universal Terrestrial Radio Access Network (E-UTRAN); S1 Application Protocol (S1AP) (Release 14)," Jan. 2017, 333 pages.
Extended European Search Report, dated Aug. 23, 2017, for corresponding European Application No. 17162849.8-1854, 20 pages.
Huawei, "UL data transmission without RRC signalling without initiating transition to active (option A)," R2-1700185, Agenda Item: 3.2.2.2, 3GPP TSG-RAN NR Adhoc, Spokane, WA, USA, Nov. 14-18, 2016, 25 pages.
International Search Report, dated Mar. 27, 2018, for corresponding International Application No. PCT/EP2018/054349, 3 pages.
NEC, "Cell reselection crossing RAN notification area boundary," R2-1701948 (Revision of R2-1700593), Agenda item: 10.3.1.2 Mobility in idle/inactive, 3GPP TSG-RAN WG2 #97, Athens, Greece, Feb. 13-17, 2017, 3 pages.
Nokia et al., "RRC Inactive procedures," R2-1700104, Agenda item: 3.2.2.1, 3GPP TSG-RAN WG2 Meeting NR Ad Hoc, Spokane, USA, Jan. 17-19, 2017, 4 pages.
Vivo, "Discussion on RAN based notification area update," R2-1701482, Agenda Item: 10.2.2.3, 3GPP TSG-RAN WG2 Meeting #97, Athens, Greece, Feb. 13-17, 2017, 3 pages.
Russian Office Action, dated Jan. 19, 2021, for Russian Application No. 2019124694/07(048125), 18 pages, (with English translation).
3$^{rd}$ Generation Partnership Project; Technical Specification Group Radio Access Network; Evolved Universal Terrestrial Radio Access (E-UTRA); Radio Resource Control (RRC); Protocol specification (Release 14), 3GPP TS 36,331, V14.2.0, Mar. 2017, 721 pages.
Communication pursuant to Article 94(3) EPC, dated Apr. 14, 2021, for the corresponding European Patent Application No. 18705655.1, 6 pages.
Japanese Office Action, dated Oct. 26, 2021, for Japanese Application No. 2019-552547, 5 pages. (English Translation).
Intel Corporation, "2-Step Random Access Procedure in NR", R2-168520, Agenda Item: 9.2.1.4, 3GPP TSG-RAN WG2#96, Reno, USA, Nov. 14-18, 2016.
Intel Corporation, "Details on the NR_RRC_Inactive State", R2-168523, Agenda Item: 9.2.2.1, 3GPP TSG RAN WG2 #96, Reno, USA, Nov. 14-18, 2016.
Intel Corporation, "Signaling Reduction During NG Core Connected Inter-RAT mobility in Inactive State", R2-1700319, Agenda Item: 3.3.2, 3GPP TSG-RAN WG2 NR Adhoc Meeting, Spokane, USA, Jan. 17-19, 2017.
Intel Corporation, "Discussion on RAN Specific Notification Area", R2-1700331, Agenda Item: 3.2.2.3, 3GPP TSG RAN WG2 NR Adhoc Meeting, Spokane, USA, Jan. 17-19, 2017.
Intel Corporation, "Data Transmission from Inactive", R2-1700333, Agenda Item: 3.2.2.2, 3GPP TSG RAN WG2 NR Ad Hoc, Spokane, USA, Jan. 17-19, 2017.
Ericsson, "Small Data: Comparison Between Solutions A and B", Tdoc R2-1700888, Agenda Item: 10.2,2.2, 3GPP TSG-RAN WG2 #97, Athens, Greece, Feb. 13-17, 2017.

* cited by examiner

| R | F2 | E | LCID | Octet 1 |
|---|----|---|------|---------|
| F | RNA ID (7 bits) | | | Octet 2 |

Fig. 15

| R | F2 | E | LCID | Octet 1 |
|---|----|---|------|---------|
| F | RNA ID (15bits) | | | Octet 2 |
| cont. RNA ID (15 bits) | | | | Octet 3 |

Fig. 16

| D/C | PDU type | R | R | R | R | R | Octet 1 |
|-----|----------|---|---|---|---|---|---------|
| E | RNA ID (7 bits) | | | | | | Octet 2 |

Fig. 17

| D/C | PDU type | R | R | R | R | R | Octet 1 |
|-----|----------|---|---|---|---|---|---------|
| E | RNA ID (15 bits) | | | | | | Octet 2 |
| cont. RNA ID (15 bits) | | | | | | | Octet 3 |

Fig. 18

USER EQUIPMENT AND BASE STATION PARTICIPATING IN RADIO ACCESS NETWORK UPDATE PROCEDURE

BACKGROUND

Technical Field

The present disclosure is directed to methods, devices and articles in communication systems, such as, 3GPP communication systems.

Description of the Related Art

Currently, the 3rd Generation Partnership Project (3GPP) works at the next release (Release 15) of technical specifications for the next generation cellular technology, which is also called fifth generation (5G). At the 3GPP Technical Specification Group (TSG) Radio Access network (RAN) meeting #71 (Gothenburg, March 2016), the first 5G study item, "Study on New Radio Access Technology" involving RAN1, RAN2, RAN3 and RAN4 was approved and is expected to become the Release 15 work item that defines the first 5G standard. The aim of the study item is to develop a "New Radio (NR)" access technology (RAT), which operates in frequency ranges up to 100 GHz and supports a broad range of use cases, as defined during the RAN requirements study (see e.g., 3GPP TR 38.913 "Study on Scenarios and Requirements for Next Generation Access Technologies", current version 14.1.0 available at www.3gpp.org and incorporated herein its entirety by reference).

One objective is to provide a single technical framework addressing all usage scenarios, requirements and deployment scenarios defined in TR 38.913, at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks. A second objective is to achieve forward compatibility. Backward compatibility to Long Term Evolution (LTE, LTE-A) cellular systems is not required, which facilitates a completely new system design and/or the introduction of novel features.

The fundamental physical layer signal waveform will be based on OFDM, with potential support of a non-orthogonal waveform and multiple access. For instance, additional functionality on top of OFDM such as DFT-S-OFDM, and/or variants of DFT-S-OFDM, and/or filtering/windowing is further considered. In LTE, CP-based OFDM and DFT-S-OFDM are used as waveform for downlink and uplink transmission, respectively. One of the design targets in NR is to seek a common waveform as much as possible for downlink, uplink and sidelink.

Besides the waveform, some basic frame structure(s) and channel coding scheme(s) will be developed to achieve the above-mentioned objectives. The study shall also seek a common understanding on what is required in terms of radio protocol structure and architecture to achieve the above-mentioned objectives. Furthermore, the technical features which are necessary to enable the new RAT to meet the above-mentioned objectives shall be studied, including efficient multiplexing of traffic for different services and use cases on the same contiguous block of spectrum.

Since the standardization for the NR of $5^{th}$ Generation systems of 3GPP is at the very beginning, there are several issues that remain unclear. For instance, there has been an ongoing discussion about a new RRC state for the user equipment so as to minimize signaling, power consumption and resource costs in the radio access network and the core network, while still being able to start a data transfer with a low delay. Further improvements may be possible to achieve these goals for the RRC state of the user equipment.

BRIEF SUMMARY

One non-limiting and exemplary embodiment facilitates providing improved procedures for supporting mobility of a user equipment.

In one general first aspect, the techniques disclosed here feature a user equipment in a mobile communication system. The UE comprises processing circuitry, which determines whether the user equipment, being located in a first radio access network notification area, first RNA, is moving to a second radio access network notification area, second RNA, different from the first RNA. The user equipment is in an inactive state out of an idle state, a connected state and the inactive state the user equipment can be in. The UE further comprises a transmitter, which transmits identification information on the first RNA to a second radio base station of the second RNA, when determining that the user equipment is moving to the second RNA. The UE further comprises a receiver which receives from the second radio base station user equipment related context information usable by the user equipment to exchange uplink and downlink data with the second radio base station.

In one general first aspect, the techniques disclosed here feature a method for operating a user equipment in a mobile communication system. The method comprises determining whether the user equipment, being located in a first radio access network notification area, first RNA, is moving to a second radio access network notification area, second RNA, different from the first RNA. The user equipment is in an inactive state out of an idle state, a connected state and the inactive state the user equipment can be in. The method further comprises transmitting identification information on the first RNA to a second radio base station of the second RNA, when determining that the user equipment is moving to the second RNA. The method further comprises receiving from the second radio base station user equipment related context information usable by the user equipment to exchange uplink and downlink data with the second radio base station.

In one general first aspect, the techniques disclosed here feature a radio base station in a mobile communication system. The radio base station comprises a receiver which receives from a user equipment identification information on a first radio access network notification area, first RNA, at which the user equipment was located before moving to the second RNA. The user equipment is in an inactive state out of an idle state, a connected state and the inactive state the user equipment can be in. The radio base station further comprises a processor, which generates user equipment related context information usable by the user equipment to exchange uplink and downlink data with the second radio base station. The radio base station comprises a transmitter, which transmits to the user equipment the generated user equipment related context information.

It should be noted that general or specific embodiments may be implemented as a system, a method, an integrated circuit, a computer program, a storage medium, or any selective combination thereof.

Additional benefits and advantages of the disclosed embodiments will be apparent from the specification and Figures. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

In the following exemplary embodiments are described in more detail with reference to the attached figures and drawings.

FIGS. 15 and 16 illustrate new formats for a MAC control element to carry an RNA identification of respectively 7 or 15 bits, FIGS. 17 and 18 illustrate new formats for a PDCP Control PDU to carry an RNA identification of respectively 7 or 15 bits.

DETAILED DESCRIPTION

Basis of the Present Disclosure
5G NR System Architecture and Protocol Stacks

As presented in the background section, 3GPP is working at the next release for the 5th generation cellular technology, simply called 5G, including the development of a new radio access technology (NR) operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology". Results and agreements are collected in the Technical Report TR 38.804 v1.0.0, incorporated herein in its entirety by reference.

Figure 1:
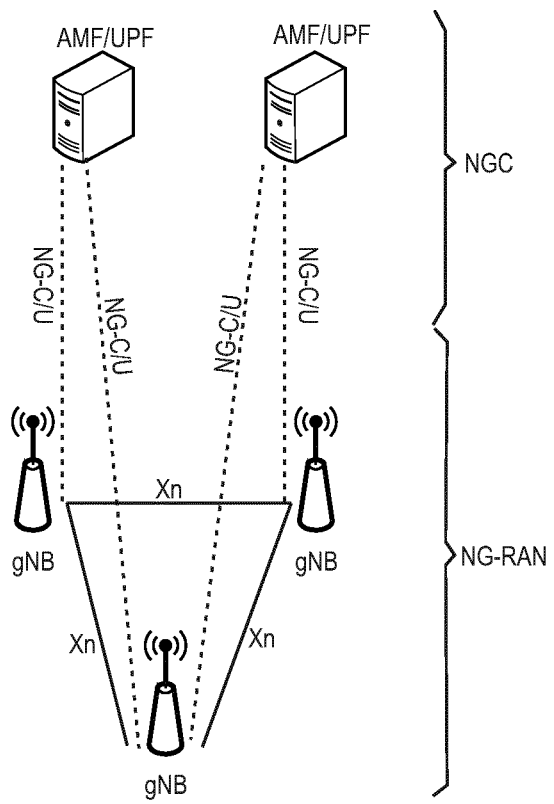
FIG. 1 shows an exemplary architecture for a 3GPP NR system, where a UE is connected to both a gNB and an LTE eNB.

Among other things, there has been a provisional agreement on the overall system architecture. The NG-RAN (Next Generation-Radio Access Network) consists of gNBs, providing the NG-Radio access user plane (new AS sublayer/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) by means of the N2 interface and to the UPF (User Plane Function) by means of the N3 interface. The NG-RAN architecture is illustrated in FIG. 1.

Figure 2:
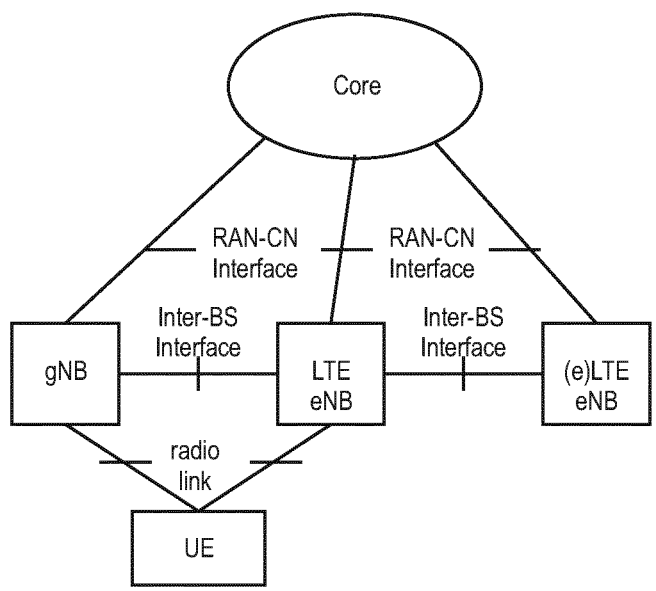
FIG. 2 shows an exemplary user plane architecture for the LTE eNB, gNB, and UE.

Various different deployment scenarios are currently being discussed for being supported, as reflected e.g., in 3GPP TR 38.801 v2.0.0 incorporated herein by reference in its entirety. For instance, a non-centralized deployment scenario (section 5.2 of TR 38.801) is presented therein, where base stations supporting the 5G NR can be deployed. FIG. 2 illustrates an exemplary non-centralized deployment scenario and is based on FIG. 5.2.-1 of TR 38.801, while additionally illustrating an LTE eNB as well as a user equipment (UE) that is connected to both a gNB and an LTE eNB (which is to be understood as an eNB according to previous 3GPP standard releases such as for LTE and LTE-A). The new eNB for NR 5G may be exemplarily called gNB.

An eLTE eNB, as exemplarily defined in TR 38.801, is the evolution of an eNB that supports connectivity to the EPC (Evolved Packet Core) and the NGC (Next Generation Core).

Figure 3:
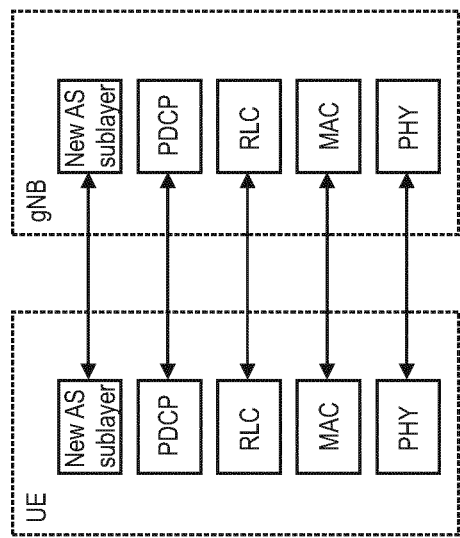
FIG. 3 illustrates the user plane protocol stack for 5G NR.
Figure 4:
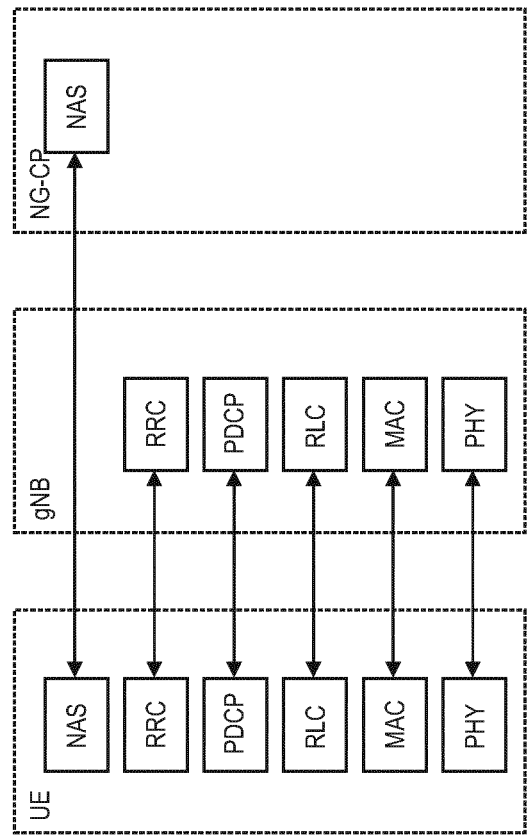
FIG. 4 illustrates the control plane protocol stack for 5G NR.

The user plane protocol stack for NR is illustrated in FIG. 3, as currently defined in TR 38.804 v1.0.0, section 5.2.1. The PDCP, RLC and MAC sublayers are terminated in the gNB on the network side. Additionally, a new access stratum (AS) sublayer is introduced above PDCP as described in sub-clause 5.4.5 of TR 38.804. The control plane protocol stack for NR is illustrated in FIG. 4, as defined in TR 38.804 v1.0.0, section 5.2.2. An overview of the Layer 2 functions is given in sub-clause 5.4.1 of TR 38.804 v1.0.0. The functions of the PDCP, RLC and MAC sublayers are listed in sub-clauses 5.4.2, 5.4.3 and 5.4.4 of TR 38.804 v1.0.0. The functions of the RRC layer are listed in sub-clause 5.5.1 of TR 38.804 v1.0.0. The mentioned sub-clauses of TR 38.804 are incorporated herein by reference.

The new NR layers exemplarily assumed at present for the 5G systems may be based on the user plane layer structure currently used in LTE(-A) communication systems. However, it should be noted that no final agreements have been reached at present for all details of the NR layers.

RRC States and RAN-Based Notification Areas

In LTE, the RRC state machine consists of only two states, the RRC idle state which is mainly characterized by high power savings, UE autonomous mobility and no established UE connectivity towards the core network, and the RRC connected state in which the UE can transmit user plane data while mobility is network-controlled to support lossless service continuity.

Figure 5:
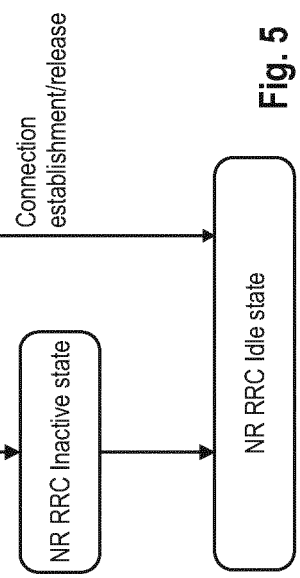
FIG. 5 illustrates the RRC state transition model discussed for 5G NR, including the new RRC inactive state.

The RRC in NR 5G as currently defined in section 5.5.2 of TR 38.804 v1.0.0, incorporated herein by reference, supports the following three states, RRC Idle, RRC Inactive, and RRC Connected, and allows the following state transitions as illustrated in FIG. 5, although many aspects thereof are still for further study:

from RRC_IDLE to RRC_CONNECTED, following the "connection setup" procedure (e.g., request, setup, complete);

from RRC_CONNECTED to RRC_IDLE, following (at least) the "connection release" procedure;

from RRC_CONNECTED to RRC_INACTIVE, following the "connection inactivation" procedure;

from RRC_INACTIVE to RRC_CONNECTED, following the "connection activation" procedure;

from RRC_INACTIVE to RRC_IDLE (uni-directional).

As apparent, a new RRC state, inactive, is defined for the new radio technology of 5G 3GPP, so as to provide benefits when supporting a wider range of services such as the eMBB (enhanced Mobile Broadband), mMTC (massive Machine Type Communications) and URLLC (Ultra-Reliable and Low-Latency Communications) which have very different requirements in terms of signaling, power saving, latency etc. The new RRC inactive state shall thus be designed to allow minimizing signaling, power consumption and resources costs in the radio access network and core network while still allowing e.g., to start data transfer with low delay. A user equipment in RRC Inactive state may support small uplink data transmissions without necessarily performing a full state transition to the RRC connected state, as discussed in Annex G of TR 38.804 v1.0.0 incorporated herein by reference.

The different states are characterized as follows by sub-clause 5.5.2 of TR 38.804 v1.0.0:

RRC_IDLE:
  Cell re-selection mobility;
  [FFS: The UE AS context is not stored in any gNB or in the UE;]
  Paging is initiated by CN;
  Paging area is managed by CN
  The UE AS context is not stored in any gNB or in the UE.
RRC_INACTIVE:
  Cell re-selection mobility;
  CN—NR RAN connection (both C/U-planes) has been established for UE;
  The UE AS context is stored in at least one gNB and the UE;
  Paging/notification is initiated by NR RAN;
  RAN-based notification area is managed by NR RAN;
  NR RAN knows the RAN-based notification area which the UE belongs to;
RRC_CONNECTED:
  The UE has an NR RRC connection;
  The UE has an AS context in NR;
  NR RAN knows the cell which the UE belongs to;
  Transfer of unicast data to/from the UE;
  Network controlled mobility, i.e., handover within NR and to/from E-UTRAN.

As apparent from the above-mentioned characteristics of the new RRC inactive state, for the UE in RRC inactive the connection (both for user plane and control plane) is maintained with RAN and the core network. In addition, the paging mechanism (may also be called notification mechanism) for user equipments in that cell is based on so called radio access network, RAN,-based notification areas (in short RNAs). The radio access network should be aware of the current RNA the user equipment is located in, and the user equipment may assist the gNB to track the UE moving among various RNAs. The RNA can be UE-specific.

A RNA can cover a single or multiple cells. It can be smaller than the core network area, used for tracking a UE in RRC idle state. While the UE in RRC inactive state stays within the boundaries of the current RNA, it may not have to update its location with the RAN (e.g., gNB). Correspondingly however, when leaving its current RNA (e.g., and moving to another RNA), the UE may update its location with the RAN. There is not yet a final agreement on how the RNAs are configured and defined. Sub-clause 5.5.2.1 of TR 38.804 v1.0.0, incorporated herein by reference, mentions two possible options that are currently discussed.

Figure 6:
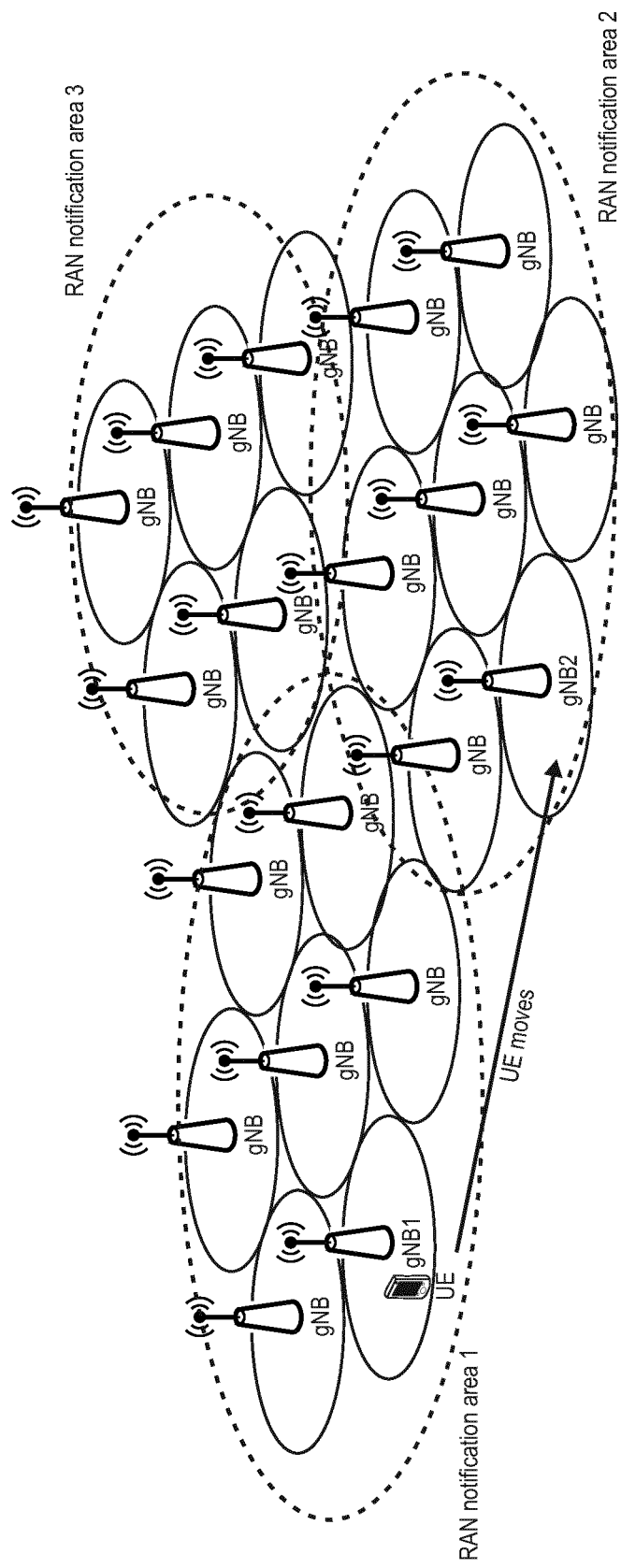
FIG. 6 illustrates three RAN-based notification areas, respectively being composed of several gNBs, as well as a UE connected to gNB1 of area 1.

FIG. 6 illustrates an example scenario where there are several RNAs, respectively composed of several gNBs. The UE is connected to a gNB1 belonging to RNA1 and is assumed to move to gNB2 of RNA2.

According to one option, a list of cells constituting the RAN-based notification area is defined. The UE is provided with an explicit list of cells (e.g., via dedicated signaling, i.e., signaling directly addressed to the UE, e.g., an RRC connection reconfiguration message), such that the UE can determine in which current RNA it is based on the current cell. According to another option, RAN areas are each being identified by a RNA ID. Each cell, specifically the gNB, broadcasts (at least one) RNA ID (e.g., in its system information; alternatively or additionally, this information can be transmitted to a UE using dedicated signaling) so that a UE knows to which area the cell belongs. At present, no decision has been made as to whether to support one or both options, or maybe a different solution is agreed upon in the future. Also no details are available about the RNA ID, such as its bit size etc.

It should be noted that a UE in RRC idle state assists the core network in tracking its location (CN-based tracking), so as to allow CN-initiated paging (in the same or similar manner as in LTE). LTE introduced a mechanism of providing individual tracking area sizes for a UE by allowing the core network to provide a list of TAIs (Tracking Area Identities) that is considered the actual tracking area for this UE. When the UE leaves this combined area of the list of TAs, the UE triggers a NAS tracking area update (TAU) procedure. The same or a similar approach could be foreseen for supporting mobility of a UE in RRC idle state in the 5G NR. The core network area may be defined differently from the RAN-based notification area, which will presumably be as large or smaller than the core network area.

RACH Procedure

A UE in RRC inactive state may support small data transmissions without fully transitioning to the RRC connected state, and may reuse the RACH (Random Access CHannel) procedure to obtain an assignment of radio resources and carry the small data. No final agreement has been reached with regard to the RACH procedure in 5G NR. As described in section 9.2 of TR 38.804 v1.0.0, incorporated herein by reference, the NR RACH procedure may support both contention-based and contention-free random access, in the same or similar manner as defined for LTE. Also, the design of the NR RACH procedure shall support a flexible message 3 size, similar as in LTE.

Figure 7:
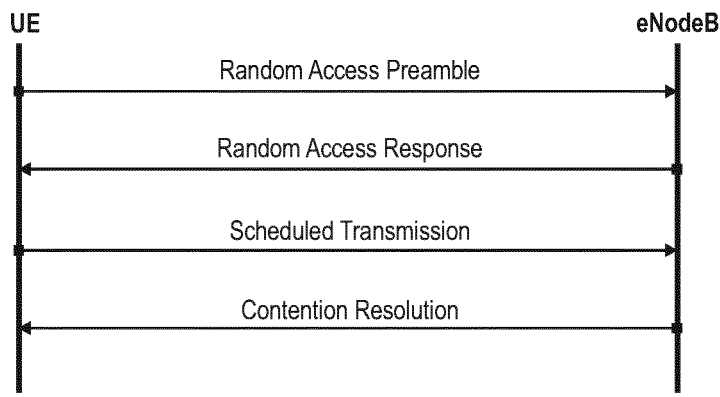
FIG. 7 illustrates the messages exchanged between an eNB and a UE when performing a contention-based RACH procedure.

The LTE RACH procedure will be described in the following in more detail, with reference to FIGS. 7 and 8. A mobile terminal in LTE can only be scheduled for uplink transmission, if its uplink transmission is time synchronized. Therefore, the Random Access Channel (RACH) procedure plays an important role as an interface between non-synchronized mobile terminals (UEs) and the orthogonal transmission of the uplink radio access. Essentially the Random Access in LTE is used to achieve uplink time synchronization for a user equipment which either has not yet acquired, or has lost, its uplink synchronization. Once a user equipment has achieved uplink synchronization, the eNodeB can schedule uplink transmission resources for it. The following scenarios are therefore relevant for random access:

- A user equipment in RRC_CONNECTED state, but not uplink-synchronized, wishing to send new uplink data or control information
- A user equipment in RRC_CONNECTED state, but not uplink-synchronized, required to receive downlink data, and therefore to transmit corresponding HARQ feedback, i.e., ACK/NACK, in the uplink. This scenario is also referred to as Downlink data arrival
- A user equipment in RRC_CONNECTED state, handing over from its current serving cell to a new target cell; in order to achieve uplink time-synchronization in the target cell, Random Access procedure is performed
- A transition from RRC_IDLE state to RRC_CONNECTED, for example, for initial access or tracking area updates
- Recovering from radio link failure, i.e., RRC connection re-establishment There is one more additional case, where user equipment performs random access procedure, even though user equipment is time-synchronized. In this scenario the user equipment uses the random access procedure in order to send a scheduling request, i.e., uplink buffer status report, to its eNodeB, in case it does not have any other uplink resources allocated in which to send the scheduling request, i.e., dedicated scheduling request (D-SR) channel is not configured.

LTE offers two types of random access procedures allowing access to be either contention based, i.e., implying an inherent risk of collision, or contention-free (non-contention based). It should be noted that contention-based random access can be applied for all six scenarios listed above, whereas a non-contention based random access procedure can only be applied for the downlink data arrival and handover scenario. A detailed description of the random access procedure can be also found in 3GPP TS 36.321, section 5.1. v14.1.0, incorporated herein by reference.

In the following the LTE contention based random access procedure is being described in more detail with respect to FIG. 7. This procedure consists of four "steps". First, the user equipment transmits a random access preamble on the Physical Random Access Channel (PRACH) to the eNodeB (i.e., message 1 of the RACH procedure). The preamble is selected by the user equipment from the set of available random access preambles reserved by the eNodeB for contention based access. In LTE there are 64 preambles per cell that can be used for contention-free as well as contention-based random access. The set of contention-based preambles can be further subdivided into two groups, so that the choice of preamble can carry one bit of information to indicate information relating to the amount of transmission resources needed for the first scheduled transmission, which is referred to as message 3 (msg3) in TS 36.321. The system information broadcasted in the cell contains the information which signatures (preambles) are in each of the two subgroups as well as the meaning of each subgroup. The user equipment randomly selects one preamble from the subgroup corresponding to the size of transmission resource needed for the message 3 transmission.

After the eNodeB has detected a RACH preamble, it sends a Random Access Response (RAR) message (message 2 of the RACH procedure) on the PDSCH (Physical Downlink Shared Channel) addressed on the PDCCH with the (Random Access) RA-RNTI identifying the time-frequency slot in which the preamble was detected. If multiple user equipments transmitted the same RACH preamble in the same PRACH resource, which is also referred to as collision, they would receive the same random access response message.

The RAR message may convey the detected RACH preamble, a timing alignment command (TA command) for synchronization of subsequent uplink transmissions, an initial uplink resource assignment (grant) for the transmission of the first scheduled transmission and an assignment of a Temporary Cell Radio Network Temporary Identifier (T-CRNTI). This T-CRNTI is used by eNodeB to address the mobile(s) which RACH preamble was detected until the RACH procedure is finished, since the "real" identity of the mobile at this point is not yet known by the eNodeB.

The user equipment monitors the PDCCH for reception of the random access response message within a given time window, which is configured by the eNodeB. In case the user equipment does not receive a random access response within the configured time window, it retransmits the preamble at the next PRACH opportunity also considering a potential back-off period.

In response to the RAR message received from the eNodeB, the user equipment transmits the first scheduled uplink transmission on the radio resources assigned by the grant within the random access response. This scheduled uplink transmission conveys the actual random access procedure message like, for example, an RRC connection request or a buffer status report. Furthermore, it includes either the C-RNTI for user equipments in RRC_CONNECTED mode or the unique 48-bit user equipment identity if the user equipments are in RRC_IDLE mode.

In case of a preamble collision having occurred in the first of the RACH procedure, i.e., multiple user equipments have sent the same preamble on the same PRACH resource, the colliding user equipments will receive the same T-CRNTI within the random access response and will also collide in the same uplink resources when transmitting their scheduled transmission in the third step of the RACH procedure. This may result in interference such that no transmission from a colliding user equipment can be decoded at the eNodeB, and the user equipments will restart the random access procedure after having reached the maximum number of retransmission for their scheduled transmission. In case the scheduled transmission from one user equipment is successfully decoded by eNodeB, the contention remains unsolved for the other user equipment(s).

For resolution of this type of contention, the eNode B sends a contention resolution message (a fourth message) addressed to the C-RNTI or Temporary C-RNTI, and, in the latter case, echoes the 48-bit user equipment identity contained in the scheduled transmission of step 3. It supports HARQ. In case of a collision followed by a successful decoding of the third message, the HARQ feedback (ACK/NACK) is only transmitted by the user equipment which detects its own identity, either C-RNTI or unique user equipment ID. Other UEs understand that there was a collision at step 1 of the RACH procedure and can quickly exit the current RACH procedure and start another one.

Figure 8:
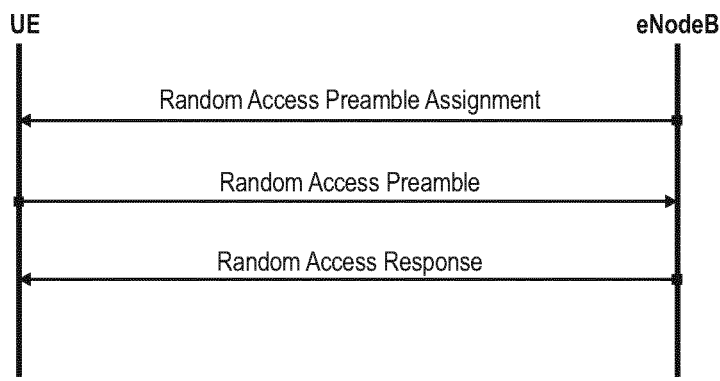
FIG. 8 illustrates the messages exchanged between an eNB and a UE when performing a contention-free RACH procedure.

FIG. 8 is illustrating the contention-free random access procedure of 3GPP LTE, which is simplified in comparison to the contention-based random access procedure. The eNodeB provides in a first step the user equipment with the preamble to use for random access so that there is no risk of collisions, i.e., multiple user equipments transmitting the same preamble. Accordingly, the user equipment is subsequently sending the preamble which was signaled by eNodeB in the uplink on a PRACH resource. Since the case that multiple UEs are sending the same preamble is avoided for a contention-free random access, no contention resolution is necessary, which in turn implies that the fourth step of the contention-based procedure shown in FIG. 7 can be omitted. Essentially, a contention-free random access procedure is finished after having successfully received the random access response by the UE.

When carrier aggregation is configured, the first three steps of the contention-based random access procedure occur on the PCell, while contention resolution can be cross-scheduled by the PCell.

Thus, a similar or same RACH procedure as just explained in connection with FIGS. 7 and 8 could be adopted in the future for the new radio technology of 5G.

However, 3GPP is also studying a two-step RACH procedure for 5G NR, where a message 1, corresponding to message 4 in the four-step RACH procedure, is transmitted at first. Then, the gNB will respond with a message 2, corresponding to messages 2 and 4 of the LTE RACH procedure. Due to the reduced message exchange, the latency of the two-step procedure may be reduced compared to the four-step procedure. The radio resources for the messages are optionally configured by the network.

UE Context Information

As in LTE, it is expected that NR 5G also makes use of UE contexts to store important information that is relevant for the communication between the UE and other entities such as the gNBs and MME (Mobility Management Entity).

Some of the UE contexts are usually generated and stored when the UE established the RRC connection with the eNB. Further, a context for the UE may be established in the MME in the core network when the UE attaches to the network.

Such UE context may hold various different types of information, such as subscription information, UE capabilities, list of radio bearer, information on logical channels, security context (including the cipher and deciphering key, RRC and user plane encryption keys, RRC integrity keys), etc. The information which is actually necessary depends on the actual implementation and may vary substantially.

For a UE in RRC Idle mode, all UE-related information can be released in the access network, although the MME may retain the UE context. Thus, whenever the UE becomes active, i.e., makes a transition from RRC idle to RCC connected, the MME may provide the UE context information to the eNB, thereby enabling the eNB in turn to create a UE context and to manage the UE.

UE contexts, specifically the information therein, are also exchanged during mobility procedures such as a handover when the UE is in RRC Connected mode. As the UE moves, the network can transfer all information related to the UE, i.e., the UE context, (possibly with any buffered data) from the old eNB (source) to the new eNB (target).

In one exemplary implementation in LTE, some of the UE-related context information is exchanged using an inter-node RRC information element, called AS-Config, which contains information about RRC configuration information in the source eNB, which can be utilized by the target eNB to determine the need to change the RRC configuration during the handover preparation phase (see TS 36.331 v14.1.0, section 10.3, incorporated herein by reference).

| AS-Config information element |
| --- |
| ```
-- ASN1START
AS-Config ::=                        SEQUENCE {
    sourceMeasConfig                          MeasConfig,
    sourceRadioResourceConfig
    RadioResourceConfigDedicated,
    sourceSecurityAlgorithmConfig
    SecurityAlgorithmConfig,
    sourceUE-Identity                         C-RNTI,
    sourceMasterInformationBlock
    MasterInformationBlock,
    sourceSystemInformationBlockType1
    SystemInformationBlockType1 (WITH COMPONENTS
                                              {...,
nonCriticalExtension ABSENT}),
    sourceSystemInformationBlockType2
    SystemInformationBlockType2,
    antennaInfoCommon                AntennaInfoCommon,
    sourceDl-CarrierFreq                      ARFCN-
ValueEUTRA,
    ...,
    [[      sourceSystemInformationBlockType1Ext     OCTET
STRING (CONTAINING
    SystemInformationBlockType1-v890-IEs)            OPTIONAL,
            sourceOtherConfig-r9
    OtherConfig-r9
    -- sourceOtherConfig-r9 should have been optional. A
target eNB compliant with this transfer
    -- syntax should support receiving an AS-Config not
including this extension addition group
        -- e.g., from a legacy source eNB
    ]],
    [[      sourceSCellConfigList-r10
    SCellToAddModList-r10                     OPTIONAL
    ]],
    [[      sourceConfigSCG-r12               SCG-Config-
r12         OPTIONAL
    ]]
}
``` |

| AS-Config information element |
|---|
| AS-Config-v9e0 ::=                       SEQUENCE {<br>    sourceDl-CarrierFreq-v9e0              ARFCN-ValueEUTRA-v9e0<br>}<br>AS-Config-v10j0 ::=                      SEQUENCE {<br>    antennaInfoDedicatedPCell-v10i0<br>    AntennaInfoDedicated-v10i0                                      OPTIONAL<br>}<br>AS-Config-v1250 ::=                      SEQUENCE {<br>    sourceWlan-OffloadConfig-r12           WLAN-OffloadConfig-<br>r12    OPTIONAL,<br>    sourceSL-CommConfig-r12                                          SL-CommConfig-<br>r12                         OPTIONAL,<br>    sourceSL-DiscConfig-r12                                          SL-CommConfig-<br>r12                         OPTIONAL<br>}<br>AS-Config-v1320 ::=                      SEQUENCE {<br>    sourceSCellConfigList-r13<br>    SCellToAddModListExt-r13               OPTIONAL,<br>    sourceRCLWI-Configuration-r13          RCLWI-Configuration-<br>r13    OPTIONAL<br>}<br>AS-Config-v14x0 ::=                      SEQUENCE {<br>    sources-V2X-CommConfig-r14                                       SL-V2X-<br>ConfigDedicated-r14                     OPTIONAL<br>}<br>-- ASN1STOP |

NOTE:
The AS-Config re-uses information elements primarily created to cover the radio interface signaling requirements. Consequently, the information elements may include some parameters that are not relevant for the target eNB e.g., the SFN as included in the MasterInformationBlock.

| AS-Config field descriptions |
|---|
| antennaInfoCommon |
| This field provides information about the number of antenna ports in the source PCell.<br>sourceDL-CarrierFreq |
| Provides the parameter Downlink EARFCN in the source PCell, see TS 36.101 [42]. If the source eNB provides AS-Config-v9e0, it sets sourceDl-CarrierFreq (i.e., without suffix) to maxEARFCN.<br>source OtherConfig |
| Provides other configuration in the source PCell.<br>sourceMasterInformationBlock |
| MasterInformationBlock transmitted in the source PCell.<br>sourceMeasConfig |
| Measurement configuration in the source cell. The measurement configuration for all measurements existing in the source eNB when handover is triggered shall be included. See 10.5.<br>sourceRCLWI-Configuration |
| RCLWI Configuration in the source PCell.<br>sourceSL-CommConfig |
| This field covers the sidelink communication configuration.<br>sourceSL-DiscConfig |
| This field covers the sidelink discovery configuration.<br>sourceRadioResourceConfig |
| Radio configuration in the source PCell. The radio resource configuration for all radio bearers existing in the source PCell when handover is triggered shall be included. See 10.5.<br>sourceSCellConfigList |
| Radio resource configuration (common and dedicated) of the SCells configured in the source eNB. |

| AS-Config field descriptions |
| --- |
| sourceSecurityAlgorithmConfig |
| This field provides the AS integrity protection (SRBs) and AS ciphering (SRBs and DRBs) algorithm configuration used in the source PCell. |
| sourceSystemInformationBlockType1 |
| SystemInformationBlockType1 (or SystemInformationBlockType1-BR) transmitted in the source PCell. |
| sourceSystemInformationBlockType2 |
| SystemInformationBlockType2 transmitted in the source PCell. |
| sourceSL-V2X-CommConfig |
| Indicates the V2X sidelink communication related configurations configured in the source eNB. |

As apparent, the AS config information element contains the security algorithm configuration, including the ciphering and deciphering key, the old UE identification, C-RNTI, used in the source cell, and many other information items.

A "context area" can be defined as a single cell or group of cells that has direct access to the stored UE Access Stratum (AS) Context. If all cells of the RNA are controlled by a single gNB, the UE context could be maintained at the level of RNA. Even if the UE is doing cell reselection within that RNA, the UE context (with the security key) would be maintained regardless of the cell in which the data transmission may occur. The UE context in RRC inactive includes e.g., the configuration of radio bearers, logical channels, and security.

It should be noted that the 3GPP standardization for the new radio technology of 5G is ongoing and the terminology of the layers and entities as assumed above could be changed in the normative phase, without affecting the functioning of the embodiments of the disclosure.

As explained in the above paragraphs, the 5G cellular system is introducing a new RRC inactive state, in which the UE may support mobility and paging based on RAN-based notification areas configured at the RAN level by the gNBs. UE mobility in RRC inactive mode needs to be properly defined in 3GPP so as to avoid any possible drawbacks in its implementation. Scenarios should be considered in which the UE is in RRC inactive mode and moves to a different cell that is not within the same RAN-based notification area. The procedures and mechanism that are to be defined for the RRC inactive state in NR 5G shall facilitate avoiding cases where the UE context is missing in the gNB(s) and/or the UE, such that uplink and downlink data can be exchanged as soon as possible, e.g., using the correct (de)ciphering key. For instance, in case the UE uses the old ciphering key (from the old gNB) after moving to a new gNB, the new gNB cannot decipher the uplink data since the UE had used the old ciphering key. Thus, the mechanisms and procedures shall allow to synchronize the ciphering key as soon as possible. The UE in RRC inactive state when moving within and across RNAs shall be able to receive the notification (paging) messages or any other downlink messages transmitted by the gNB.

The present disclosure thus shall present solutions facilitating to overcome one or more of the disadvantages and/or meet one or more of the requirements mentioned above.

DETAILED DESCRIPTION OF PRESENT DISCLOSURE

In the following, UEs, base stations, and procedures will be described for the new radio access technology envisioned for the 5G mobile communication systems. Different implementations and variants will be explained as well. The following detailed disclosure was facilitated by the discussions and findings as described in the previous section "Basis of the present disclosure" and may be based at least on part thereof.

In general, it should be however noted that only few things have been actually agreed on with regard to the 5G cellular communication system such that many assumptions have to be made in the following so as to allow explaining the principles underlying the present disclosure in a clear manner. These assumptions are however to be understood as merely examples that should not limit the scope of the disclosure. A skilled person will be aware that the principles of the following disclosure and as laid out in the claims can be applied to different scenarios and in ways that are not explicitly described herein.

Moreover, terms used in the following are closely related to LTE/LTE-A systems or to terminology used in the current study items for 3GPP 5G, even though specific terminology to be used in the context of the new radio access technology for the next 3GPP 5G communication systems is not fully decided yet. Consequently, a skilled person is aware that the disclosure and its scope of protection should not be restricted to particular terms exemplary used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently-used terminology for 5G NR is gNB.

Figure 9:
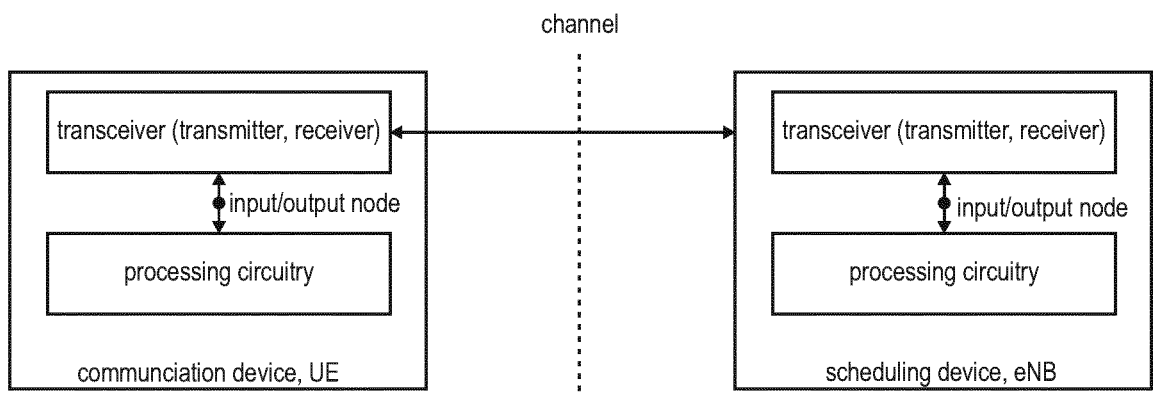
FIG. 9 illustrates the exemplary and simplified structure of a UE and an eNB.

FIG. 9 illustrates a general, simplified and exemplary block diagram of a user equipment (also termed communication device) and a scheduling device (here assumed to be located in the base station, e.g., the LTE eNB or the gNB in 5G NR). The UE and eNB/gNB are communicating with each other over a (wireless) physical channel respectively using the transceiver.

The communication device may comprise a transceiver and processing circuitry. The transceiver in turn may comprise a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange received/transmitted data. The transceiver may include the RF front including one or more antennas, amplifiers, RF modulator/demodulator and the like. The processing circuitry may implement control tasks such a controlling the transceiver to transmit user data and control data provided by the processing circuitry and/or receive user data and control data which is further processed by the processing circuitry.

A simple and exemplary scenario is assumed in the following, as illustrated in FIG. 6, where a UE is currently attached to a gNB1 of the RAN-based notification area 1 (RNA1) and is moving to another RNA2. It is further exemplarily assumed that the UE was exchanging data with the gNB1 in RRC connected mode. Correspondingly, in the usual manner necessary information, e.g., in form of UE contexts, was established at least in the UE and the gNB1, used by both entities—among other things—in the process of communicating with each other (e.g., to exchange user data). Exemplarily, such information may comprise one or more of the following: security information (such as the ciphering and deciphering keys or information for integrity protection), information on the established data connections between the UE and gNB1, UE capability information (e.g., radio access technology, E-UTRA, UTRA . . . , UE category, etc.), radio resource configuration, etc. The term "data connection" can be used generally to refer to any connection over which data can be exchanged, e.g., radio bearers (signaling radio bearers and/or data radio bearers).

Also in other entities, such as the MME (Mobility Management Entity) or serving gateways in the core network, contexts relating to the UE may be established.

It is further exemplarily assumed that the UE supports the new radio (NR) technology of the 5G cellular communication system currently under development by the 3GPP. This includes the support of the new RRC state, RRC inactive, as explained above in connection with the 5G NR state transition model of FIG. 5.

It is assumed that eventually the UE makes a transition to the RRC inactive mode. UE state transitions may be e.g., under control of the serving base station, i.e., here the gNB1. One reason to transition to the RRC inactive mode is that none or only a small amount of data is exchanged between the gNB1 and the UE, such that the gNB1 may decide to make use of the RRC inactive mode, e.g., so as to save power in the UE. Thus, the gNB1 may instruct the UE to transition to the RRC inactive mode, e.g., by sending an appropriate RRC message, such as a RRC connection sus-pend message (may also be called differently, such as RRC connection inactivation message).

The UE when being in RRC inactive mode may be configured so as to support and assist in mobility procedures. A UE in RRC inactive state should be reachable e.g., by the gNBs and/or core network entities (e.g., the MME) using a paging or notification mechanism. The UE may assist in this procedure by updating its location with the radio access network and/or core network. As explained before, RAN-based notification areas (RNAs) are defined so as to keep track of the UE's location at the RAN level. For the following illustration it is exemplary assumed that the RNAs are identified based on RNA IDs, which could be e.g., broadcast by each gNB in its radio cell within system information (e.g., in form of a SIB, system information block, as commonly known from LTE). Although RNA IDs are exemplary assumed for the following explanations, it should also be noted that the RAN-based notification areas can be defined differently too, e.g., by using a list of cell IDs, composing respective RNAs as also mentioned before.

The UE may perform an RNA update procedure whenever necessary, e.g., when determining that the UE is in a new RNA and/or on a regular basis (e.g., after expiry of a corresponding timer). For instance, the UE will determine when it is located in a new RNA and will then perform the RNA update procedure. The RNA update procedure involves that the UE informs the new gNB about its old RNA. In the exemplary scenario of FIG. 6, the UE, when reaching the gNB2 of the new, different, RNA2, will inform gNB2 about its old RNA1. This may be done e.g., by transmitting identification information of RNA1 (such as the RNA ID) to the gNB2.

In turn, the gNB2 can retrieve the old UE context(s) used by the UE in RNA1 when communicating e.g., with the old gNB1. The gNB2 may thus learn whether it has to update any UE-related information for being able to properly communicate with the UE. The gNB2 will thus provide corresponding updated UE context information to the UE, which the UE may use in the communication with the new gNB2. For instance, the security information, as part of the UE context, may be updated (e.g., the ciphering and deciphering keys), or configuration information of radio bearers, or part of the MAC or DRX configuration may be updated as well.

Figure 10:
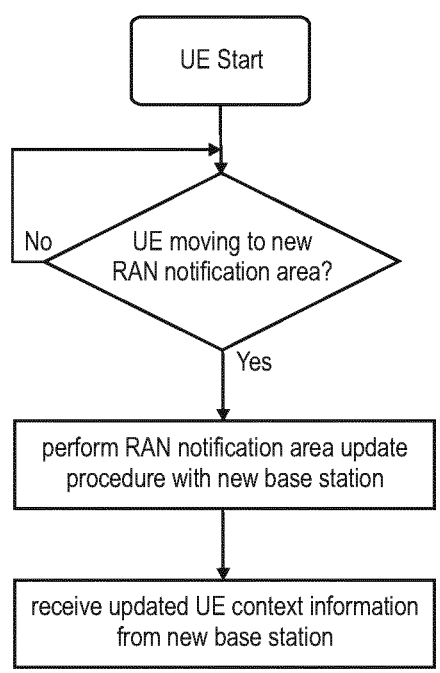
FIG. 10 illustrates a simplified and exemplary flow diagram for the UE behavior according to a general solution of the present disclosure.

FIG. 10 shows a sequence diagram for processing on the UE side, according to a basic implementation of an embodiment as explained above. As apparent therefrom, the UE performs three main processes, i.e., determining whether the UE is moving to a new RNA, in which case the UE performs the RNA update procedure with the new base station (here gNB2), and in response the UE receives from the new base station updated UE related context information so as to facilitate communication between the UE and the new base station.

The UE is thus provided at a very early stage with the necessary information to receive and transmit messages with the new gNB2. Thus, the UE can be reached by a paging/notification message, and also downlink messages can be provided to the UE. Since the UE contexts between the gNB2 and the UE are synchronized (basically the same necessary information is available at the UE and the gNB2), communication between the entities will be immediately possible. Put differently, the UE can use the updated UE context information for transmitting data to the new gNB and conversely can use the updated UE context information for receiving data from the new gNB.

Several different variations and implementations of the basic embodiment explained above with reference to FIG. 10 are possible.

As explained above, the UE determines that it is located in the new RNA. Assuming that RNAs are identified based on RNA IDs, this determination process may involve the comparison of the RNA ID received from the old gNB with the RNA ID received from the new gNB. Correspondingly, when the old RNA ID is different from the new RNA ID, the UE will determine that it has moved to a new RAN notification area and may then additionally determine to perform the RNA update procedure.

The RNA update procedure can be implemented in different ways, as will be explained in the following. Some of the implementations will reuse messages of the RACH procedure that can be performed between the UE and the new gNB2. As previously explained (e.g., with reference to FIGS. 7 and 8), a RACH procedure, similar or the same as the one already standardized for LTE—(A), is currently studied for 5G NR (see TR 38.804 v1.0.0), either as a four-step procedure or a two-step procedure. As discussed before, the RACH procedure can be used by the UE to obtain a resource grant from a gNB, and in this case to use the assigned radio resources to perform the RNA update procedure.

Figure 11:
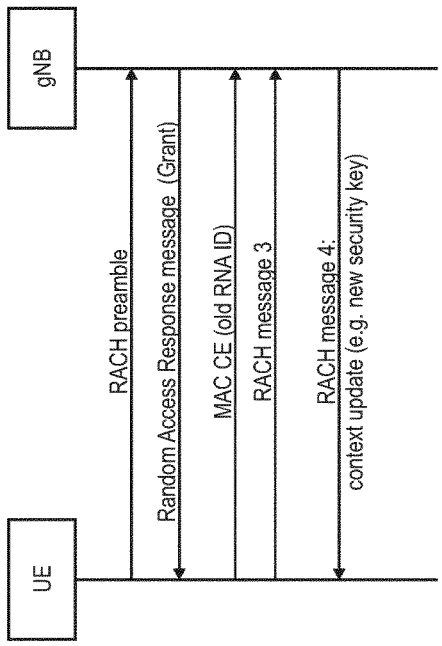
FIGS. 11 to 14 illustrate message exchanges between a UE and a target gNB according to various implementations of the present disclosure.

One implementation of the RNA update procedure will be explained with reference to FIG. 11. In this exemplary implementation, the UE, upon determining that it is located in a new RNA, will initiate a RACH procedure and will accordingly transmit a RACH preamble to the new gNB as the first message of the RACH procedure. As usual, the new gNB will respond with a RAR (Random Access Response) message, including at least an assignment of radio resources usable by the UE, and possibly including other information such as a Timing Advance value and a temporary C-RTNI if necessary.

The UE uses the assigned radio resources to transmit the identification information of its old (source) RNA (e.g., the RNA ID) in the third RACH message. In more detail, the third RACH message may be an RRC message, such as the RRC Connection Request message already known from the standardized RACH procedure for LTE-(A). Considering a specific implementation that reuses LTE-(A) RACH & RRC procedures, a new cause for the RRC connection request message can be defined, the new cause identifying that the UE performs an RNA update procedure.

Figure 12:
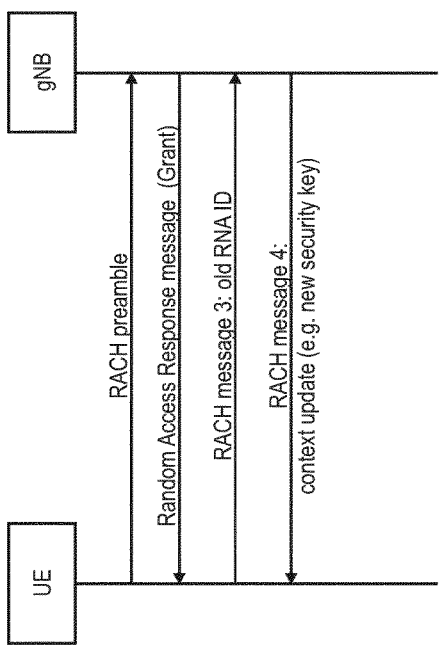

Other implementations of the RNA update procedure use the first message of the RACH procedure for the UE to transmit the identification information of its old RNA to the new gNB. As illustrated in FIG. 12, the RACH preamble message transmission performed by the UE as the first step of the initiated RACH procedure can also carry the old RNA ID to the new gNB. In one exemplary implementation, a two-step RACH procedure can be provided in which the first message, transmitted from the UE to the new gNB, contains the preamble as well as the RNA ID, while the second message, transmitted from the new gNB to the UE, is a combination of the second and fourth messages of a typical four-step RACH procedure.

The radio resources for the UE to transmit the first message of this two-step RACH procedure, can be reserved in advance, e.g., being broadcast by the new gNB in its radio cell using system information (e.g., in system information block messages). These reserved radio resources can then be used by the UE to perform the first RACH procedure transmission, which also involves the transmission of the old RNA ID. The old RNA ID can be transmitted in the PUSCH following the transmission of the preamble sequence; in one exemplary implementation, the first 3 OFDM symbols can be used to transmit the preamble and the next 3 OFDM symbols can be used for transmitting the PUSCH, including the RNA ID. The last OFDM symbol can be used for timing adjustment.

As a further variation, either the preamble part or the DMRS (Demodulation Reference Signal) can be used by the new gNB to perform the channel estimation for receiving the PUSCH part, including the old RNA ID.

Figure 13:
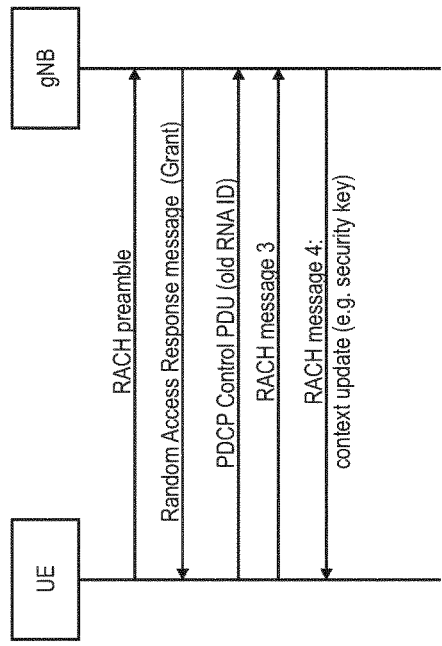
Figure 14:
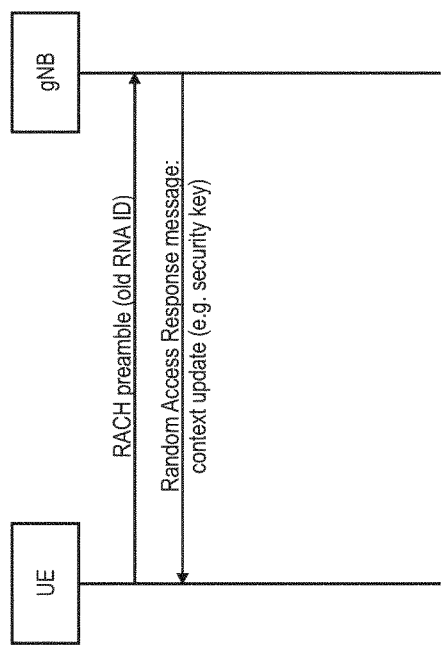
Figure 21:
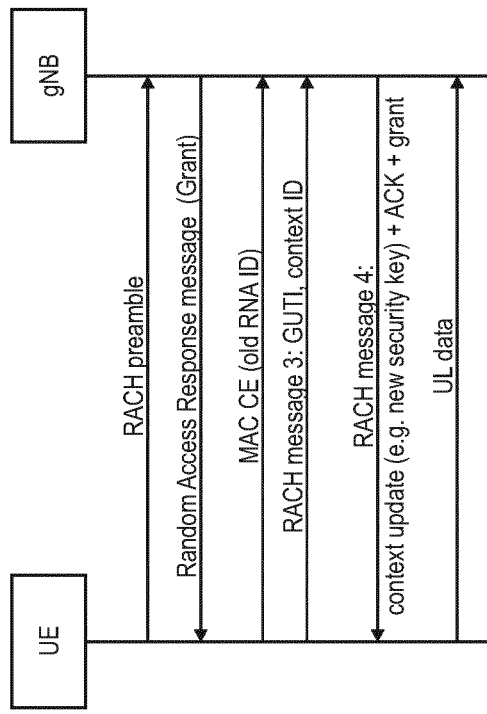
FIGS. 19 to 22 illustrate message exchanges between a UE and a target gNB respectively based on FIGS. 11 to 14 but according to further specific implementations of the present disclosure.
Figure 22:
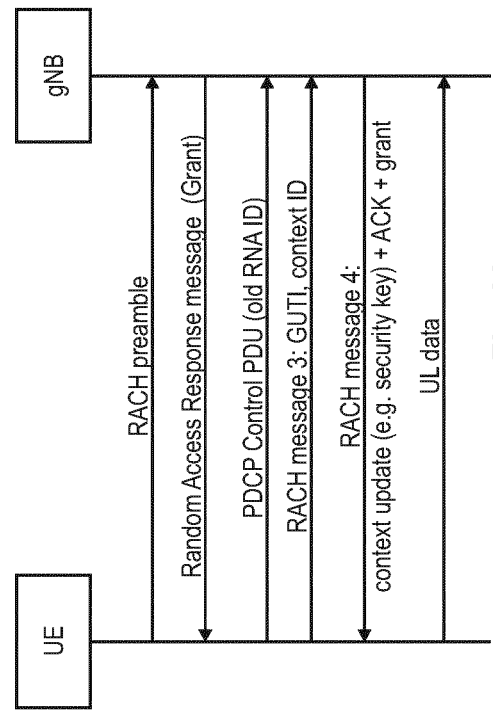
Figure 19:
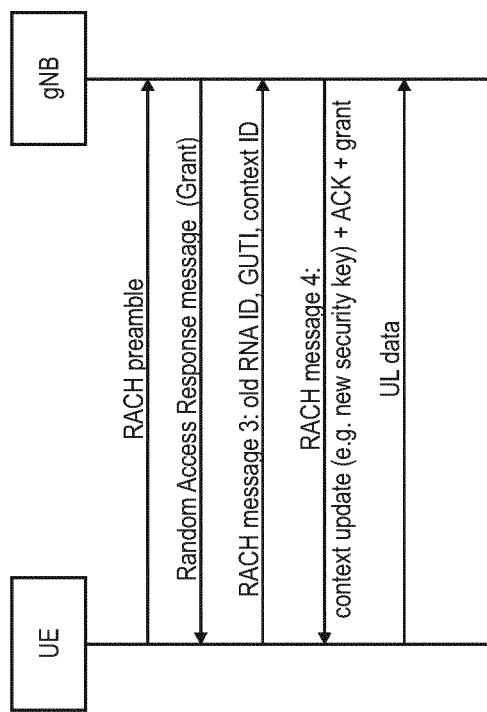
Figure 20:
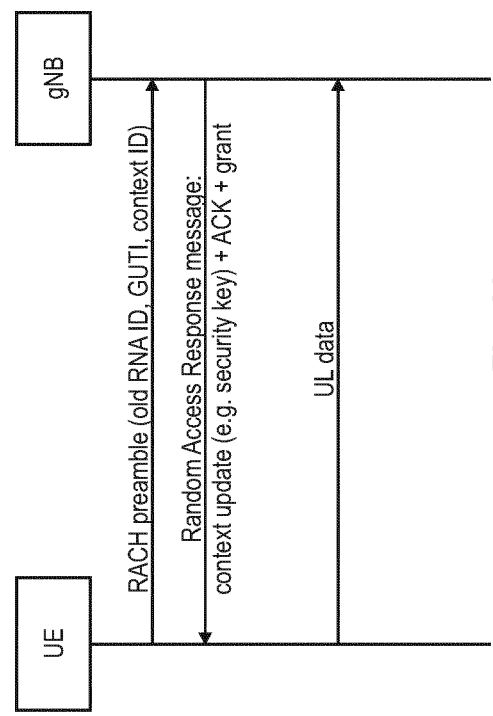

Further alternatives regarding how to transmit the old RNA ID to the new gNB are illustrated in FIGS. 13 and 14. As apparent from FIG. 13, the UE may use a Control Element (CE) of the MAC layer to transport the identification information of the old RNA (here the RNA ID) to the new gNB. In one exemplary implementation, a new MAC CE can be defined, the format of which depends on the actual size of the RNA ID. Two different exemplary formats of a new MAC CE for carrying an RNA ID are illustrated in FIGS. 15 and 16. The MAC CE format as shown in FIG. 15 assumes a size of 7 bits for the RNA ID, whereas the MAC CE format as shown in FIG. 16 assumes a size of 15 bits for the RNA ID. The F-bit field in the second octet allows in combination with the F2 field the UE to differentiate whether the RNA ID field, following the F-bit field, is of a length of 7 bits or 15 bits, as already implemented in LTE standards, see TS 36.321 v14.1.0, section 6.2.1 incorporated herein by reference. R-fields indicate reserved bits that do not have at present a particular function, but that may be used in the future.

The 5-bit LCID field allows to differentiate between the different types of MAC control elements, and many LCID values are already defined to identify e.g., power headroom reports, buffer status reports, timing advance commands, DRX commands etc. In order to identify the MAC control element that is used for the RNA update procedure as described above, any of the non-used LCID values (in LTE-(A), 01011-1011, as apparent from Table 6.2.1-1 on page 82 of TS 36.321 v14.1.0, incorporated herein by reference) can be used in said respect, e.g., the value 01011.

The implementation according to FIG. 14 uses a control PDU of the PDCP layer to carry the old RNA ID. In one exemplary implementation, a new PDCP control PDU format can be created for the purpose of carrying an RNA ID, such as exemplarily illustrated in FIGS. 17 and 18. The PDCP Control PDU format of FIG. 17 assumes that the RNA ID has only 7 bits, while the PDCP Control PDU format of FIG. 18 assumes that the RNA ID has 15 bits. The field D/C distinguishes between a control and data PDU of the PDCP layer, where C=1 may exemplarily indicate a control PDU. The 3-bit PDU type field indicates the type of PDU that is carried, such as a PDCP status report, or an interspersed ROHC feedback packet. A new bit value for the PDU type field can be reserved to identify an RNA update. As defined in section 6.3.8 of TS 36.323 v14.2.0, presently bit values 011-111 are not used (reserved), one of which can be used for the purpose of identifying an PDCP control PDU for the RNA update procedure, e.g., 111. R-fields indicate reserved bits that do not have at present a particular function, but that may be used in the future. The E-bit field in the second octet allows the UE to differentiate whether the RNA ID field, following the E-bit field, is of a length of 7 bits or 15 bits, e.g., E=0 meaning 7 bits and E=1 meaning 15 bits.

As shown in FIGS. 13 and 14, the MAC CE or the PDCP Control PDU is transmitted in parallel to the RACH procedure that can be initiated by the UE also when determining that the UE is in a new RNA. Using this RACH procedure, the UE will be assigned the necessary radio resources to transmit the MAC CE or PDCP control PDU. Correspondingly, with the Random Access Response message (second message of the RACH procedure) the UE receives a grant of radio resources, (at least part of) which it can respectively use to transmit the MAC CE and the PDCP Control PDU, as illustrated in FIGS. 13 and 14. This has the advantage that no separate radio resources need to be reserved in advance by the base station so as to perform the RNA update procedure.

FIGS. 13 and 14 also exemplarily illustrate that the UE additionally proceeds with RACH procedure by transmitting the RACH message 3 to the new gNB. The RACH message 3 can be used in these implementations in the usual manner, e.g., so as to carry the RRCConnectionRequest message, including the UE identity.

As presented above with reference to FIG. 11-18, there are various solutions on how to provide identification information of the old source RNA to the new gNB. In any case, the gNB will receive from a UE entering its radio cell the corresponding information on the old RNA. As will be explained in the following, this information on the old RNA can then be used by the new gNB to retrieve the old UE contexts and to perform updates of the UE contexts where necessary, at least in the UE so as to facilitate communication between the UE and the new gNB.

As mentioned above with reference to FIG. 10, the gNB will determine whether UE related context information has to be updated in the UE, and in the affirmative case, will proceed to do so. The different implementations presented in FIGS. 11 to 14 provide the new gNB with the possibility to use messages of the RACH procedure to carry the necessary updated UE-related context information. In more detail, the implementations in FIGS. 11, 13, and 14 use the fourth RACH message, to carry information for the context update to the UE (such as a new security key, or DRX configuration, to be applied between the new gNB2 and the UE). Usually in LTE-(A) systems, the fourth message of the RACH procedure is used for contention resolution (i.e., in case of a collision by several UEs transmitting the same preamble) and carries the RRC Connection Setup message. In the context of the RNA update procedure however, this fourth message is also used to carry the UE-related context information which needs to be updated in the UE (such as the security parameters etc.). In one exemplary LTE-(A) implementation, the RRC Connection Setup message as defined in TS 36.331 v14.1.0, incorporated herein by reference, can be extended to also carry other necessary UE-related context information (the security parameters etc.). Alternatively, a new RRC message can be defined specifically for the purpose of updating the UE-related contexts in the UE.

Alternatively, the solution presented in FIG. 12 foresees to use the random access response message (message 2) of the RACH procedure to carry the context information update. Usually, the random access response message, as currently defined in LTE-(A), carries for instance the uplink radio resource grant, the timing advance, and a Temporary C-RNTI. However, the RAR message could be extended to also carry other necessary UE-related context information to be updated in the UE (such as the security parameters).

As mentioned before, the new gNB, upon receiving from the UE ID information on the old RNA, will retrieve the old UE context information so as to then be able to update the UE-related context information in the UE. There are various solutions on how the new gNB may retrieve the old UE context information. According to one exemplary solution it may be assumed that there is a central gNB in each RAN notification area, which holds all the relevant UE context information, and which may be reached by the new gNB to retrieve same. In said respect it may be assumed that this central gNB of each respective RNA is known to other gNBs. Consequently, the new gNB will determine this central gNB of the source RNA1, based on the ID information (e.g., RNA ID) received from the UE, and will proceed to contact this central gNB of the source RNA1 to retrieve the old UE context information. According to a more detailed but exemplary implementation, the old UE context can be located and retrieved by using a context ID, previously defined by a gNB in the old RNA. This context ID, which is also known to the UE, can be transmitted by the UE to the new gNB2 during the RNA update procedure too, e.g., together with the old RNA ID. In turn, the new gNB2 can retrieve the old UE context from the old RNA based on this context ID.

Assuming further that also in the new RNA2 a context identification will be generated for the UE context that is to be used within the RNA2, other exemplary implementations foresee that the new gNB2 transmits this new context ID (valid in RNA2) to the UE, e.g., when transmitting the updated UE context information. This new context ID is valid for the new RNA.

A further variation of the above described implementations provides an additional step according to which the target gNB proceeds to have the old UE contexts in the source RNA1 (and its gNB(s)) deleted. For instance, the gNB, when retrieving the old UE context from the central gNB of the source RNA1, additionally instructs the central gNB to delete the retrieved UE context, which is no longer necessary in the old RNA.

Another variation of the above described implementations provides additional step(s) to update further UE-related contexts in other entities, such as the MME of the core network. For instance, in case the UE is to receive any data in the downlink, an update of the UE-related contexts in the MME should be performed. In one exemplary implementation, the UE transmits a global identifier of the UE, such as the IMSI (International Mobile Subscriber Identity) or the GUTI (Globally Unique Temporary Identifier) or TMSI (Temporary Mobile Subscriber Identity), to the new gNB, e.g., together with the old RNA ID. By using the global identifier, the new gNB may identify and contact the MME responsible for the UE so as to update the relevant UE-related contexts therein, e.g., the serving gateway will have to be changed so as to switch path to new gNB. Changing the serving gateway could be done e.g., using a Path Switch request of the S1 application protocol (see TS 36.413 v14.1.0, incorporated herein by reference) transmitted from the new gNB to the MME responsible for the UE. In turn, the MME can contact the serving gateway so as to respectively update the necessary UE-related context information therein.

In another exemplary implementation, the UE can directly send a message to its responsible MME to update the relevant UE context, such as the serving gateway information. The UE may have to first transition to the RRC connected state in order to be able to transmit such message to its MME. In a more detailed exemplary implementation, the UE may first activate the RRC Connection with the gNB, and then sends a Path Switch Request message to the MME via NAS signaling (Non-Access Stratum) (the Path Switch Request could be the one of the S1 application protocol as explained above). The NAS message with the Path Switch Request may include the global identity of the UE and/or the ID of the new and/or old cell. In response, the MME may update the contexts of the UE and may also contact the serving gateway to change the path from the old gNB to the new gNB.

In a further different exemplary implementation, the new gNB contacts a gNB of the old RNA1 (e.g., the central gNB mentioned before), with a request to update the UE-related contexts in the MME responsible for the UE. Also for this implementation, the UE can provide a global identifier of the UE (GUTI, IMSI, or TMSI, see above) to the new gNB, which in turn forwards this UE global identifier to the old gNB. Thus, the old gNB, when contacting the MME, will be able to identify the UE, which contexts have to be updated, based on this global ID. This can be done similar to the example Patch Switch Request performed by the new gNB as explained above.

In any case, the MME will thus be contacted so as to update the UE-related context information. In turn, the MME may also be responsible for deleting UE context information that is out of date in entities of the core network, such as the old serving gateway.

In a further variation of the above explained embodiments the UE, when attaching to the new gNB of the new RNA, can be configured with a new UE identification, such as the C-RNTI, which is then valid for the communication within the new RAN notification area. For instance, the new UE identification may be provided to the UE in the UE context information transmitted by the new gNB to the UE for the RNA update procedure. Alternatively, the new UE identification may be provided to the UE separately from the UE context information.

According to a further variation of the above implementations, the UE, when performing the RNA update procedure, can transition to the RRC connected state. The gNB can decide to transition the gNB to RRC connected state depending on the circumstances, e.g., in case UE wants to update the UE-related contexts in the MME (as described above), the UE can be transferred to RRC connected state.

In further variations of the above implementations, the gNB may acknowledge the successful reception of the old RNA ID during the RNA update procedure. For instance, the gNB may transmit an ACK together with the context update to the UE. Furthermore, the gNB may also assign further radio resources when sending the UE context update in order to allow the UE to transmit uplink data using the updated UE-context (e.g., new security keys, ciphering key, etc.).

FIGS. 19 to 22 are based respectively on FIGS. 11 to 14, additionally illustrating that the UE can transmit a global UE identifier (here GUTI, but may also be another entity e.g., the IMSI or TMSI) and the context ID to the gNB when performing the RNA update procedure as explained above with regard to the respective variations. In the exemplary implementations according to FIGS. 21 and 22, the GUTI and context ID are transmitted within the RACH message 3 (in a similar manner as done for the solutions illustrated with reference to FIG. 19) while the old RNA ID is transmitted using the MAC CE respectively the PDCP Control PDU. Alternatively, in both the solution according to FIGS. 21 and 22, the GUTI and/or the context ID could be sent in the MAC CE respectively the PDCP Control PDU together with the old RNA ID.

As further apparent from FIGS. 19 to 22, the gNB is exemplary assumed to provide an acknowledgement for the previously received message of the RNA update procedure (with the old RNA ID etc.) as well as a grant of further uplink radio resources so as to allow the UE to subsequently perform an uplink data transmission to the new gNB2.

Further Aspects

According to a first aspect, a user equipment in a mobile communication system is provided. The UE comprises processing circuitry, which determines whether the user equipment, being located in a first radio access network notification area, first RNA, is moving to a second radio access network notification area, second RNA, different from the first RNA. The user equipment is in an inactive state out of an idle state, a connected state and the inactive state the user equipment can be in. The UE further comprises a transmitter, which transmits identification information on the first RNA to a second radio base station of the second RNA, when determining that the user equipment is moving to the second RNA. The UE further comprises a receiver which receives from the second radio base station user equipment related context information usable by the user equipment to exchange uplink and downlink data with the second radio base station.

According to a second aspect provided in addition to the first aspect, the transmitter, when transmitting the identification information on the first RNA to the second radio base station, transmits the identification information on the first RNA in a message of a random access channel procedure. In an optional implementation of the second aspect, the third message of the random access channel procedure is used in said respect.

According to a third aspect which is provided in addition to the first aspect, the transmitter, when transmitting the identification information on the first RNA to the second radio base station, transmits the identification information on the first RNA together with a first message of a random access channel procedure. Optionally, the first message of the random access channel procedure comprises a random access preamble.

According to a fourth aspect provided in addition to the first aspect, the transmitter, when transmitting the identification information on the first RNA to the second radio base station, transmits the identification information on the first RNA in a Medium Access Protocol, MAC, control element. Optionally, the user equipment uses, for transmitting the MAC control element, radio resources allocated by the second radio base station to the user equipment as part of a random access channel procedure.

According to a fifth aspect provided in addition to the first aspect, the transmitter, when transmitting the identification information on the first RNA to the second radio base station, transmits the identification information on the first RNA in a Packet Data Convergence Protocol, PDCP, Control Packet Data Unit, PDU. Optionally, the user equipment uses, for transmitting the PDCP Control PDU, radio resources allocated by the second radio base station to the user equipment as part of a random access channel procedure.

According to a sixth aspect provided in addition to one of the second, fourth and fifth aspects, the receiver, when receiving the user equipment related context information from the second radio base station, receives the user equipment related context information with a fourth message of a random access channel procedure.

According to a seventh aspect provided in addition to the third aspect, the receiver, when receiving the user equipment related context information from the second radio base station, receives the user equipment related context information with a second message of a random access channel procedure. Optionally, the second message of the random access channel procedure comprises an assignment of uplink radio resources to the user equipment.

According to an eighth aspect provided in addition to one of the first to seventh aspects, the receiver, when in operation, receives from the second radio base station identification information of the second RNA. Optionally, the identification information of the second RNA is broadcast by the second radio base station throughout its radio cell in system information. Further, the processing circuitry, when determining whether the user equipment moves to the second RNA, determines that the user equipment moves to the second RNA in case the identification information of the first RNA is different from the identification information of the second RNA.

According to a ninth aspect provided in addition to one of the first to the eighth aspects, the processing circuitry, when determining that the user equipment is moving to the second RNA, transitions the user equipment from the inactive state to the connected state.

According to a tenth aspect provided in addition to one of the first to ninth aspects, the user equipment related context information comprises at least one of the following:
  security information usable between the second radio base station and the user equipment, such as a ciphering key to cipher data before transmission and a deciphering key to decipher data after reception,
  information on data connections at least between the second radio base station and the user equipment.

According to an eleventh aspect provided in addition to one of the first to tenth aspects, the transmitter, when transmitting the identification information on the first RNA to the second radio base station, also transmits to the second radio base station identification information of user equipment related context information used by the user equipment to exchange data with a radio base station of the first RNA. This identification information is usable by the second radio base station to obtain the user equipment related context information for the first RNA. In addition or alternatively, the transmitter, when transmitting the identification information on the first RNA to the second radio base station, also transmits to the second radio base station an identifier of the user equipment, which can be used by the second radio station to contact an entity in the core network to update context information in said core network entity relating to the user equipment.

According to a twelfth aspect provided in addition to one of the first to eleventh aspects, the receiver, when in operation, receives from the second radio base station a new user identification valid for the second RNA.

According to a thirteenth aspect provided in addition to one of the first to twelfth aspects, the user equipment and the second radio base station support the new radio, NR, technology of the 5th Generation, 5G, of the 3GPP, 3rd Generation Partnership Project.

According to a fourteenth aspect provided in addition to the first to thirteenth aspects, the transmitter, when in operation, transmits user data to the second radio base station using the received user equipment related context information. In addition or alternatively, the receiver, when in operation, receives user data from the second radio base station based on the received user equipment related context information.

According to a fifteenth aspect, a method for operating a user equipment in a mobile communication system is provided. The method comprises determining whether the user equipment, being located in a first radio access network notification area, first RNA, is moving to a second radio access network notification area, second RNA, different from the first RNA. The user equipment is in an inactive state out of an idle state, a connected state and the inactive state the user equipment can be in. The method further comprises transmitting identification information on the first RNA to a second radio base station of the second RNA, when determining that the user equipment is moving to the second RNA. The method further comprises receiving from the second radio base station user equipment related context information usable by the user equipment to exchange uplink and downlink data with the second radio base station.

According to a sixteenth aspect, a radio base station of a second radio access network notification area, second RNA, in a mobile communication system is provided. The radio base station comprises a receiver which receives from a user equipment identification information on a first radio access network notification area, first RNA, at which the user equipment was located before moving to the second RNA. The user equipment is in an inactive state out of an idle state, a connected state and the inactive state the user equipment can be in. The radio base station further comprises a processor, which generates user equipment related context information usable by the user equipment to exchange uplink and downlink data with the second radio base station. The radio base station comprises a transmitter, which transmits to the user equipment the generated user equipment related context information.

According to a seventeenth aspect provided in addition to the sixteenth aspect, the receiver, when in operation, receives identification information of user equipment related context information used by the user equipment to exchange data with a radio base station of the first RNA. The processor, when in operation, obtains the user equipment related context information for the first RNA based on the received identification information.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Further, the various embodiments may also be implemented by means of software modules, which are executed by a processor or directly in hardware. Also a combination of software modules and a hardware implementation may be possible. The software modules may be stored on any kind of computer readable storage media, for example, RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment (UE) in a mobile communication system, the user equipment comprising:
   processing circuitry, which in operation, determines whether the user equipment, being located in a first radio access network notification area (first RNA) is moving to a second radio access network notification area (second RNA) different from the first RNA, the user equipment being in an inactive state out of an idle state, a connected state and the inactive state the user equipment can be in;
   a transmitter, which in operation, transmits identification information on the first RNA to a second radio base station of the second RNA, when determining that the user equipment is moving to the second RNA, wherein the identification information on the first RNA comprises an identifier of the user equipment allocated by a first radio base station of the first RNA; and
   a receiver, which in operation, receives from the second radio base station user equipment related context information usable by the user equipment to exchange uplink and downlink data with the second radio base station, new UE identification allocated by the second radio base station, an acknowledgement (ACK), and grant of uplink radio resources,
   wherein, to update the user equipment related context information in a core network entity that is responsible for the user equipment, the transmitter, when in operation, transmits a path switch request message including the user equipment related context information directly to the core network entity.

2. The user equipment according to claim 1, wherein the transmitter, when transmitting the identification information on the first RNA to the second radio base station, transmits the identification information on the first RNA with a third message of a random access channel procedure.

3. The user equipment according to claim 1, wherein the transmitter, when transmitting the identification information on the first RNA to the second radio base station, transmits the identification information on the first RNA with a first message of a random access channel procedure.

4. The user equipment according to claim 1, wherein the transmitter, when transmitting the identification information on the first RNA to the second radio base station, transmits the identification information on the first RNA in a Medium Access Protocol (MAC) control element.

5. The user equipment according to claim 1, wherein the transmitter, when transmitting the identification information on the first RNA to the second radio base station, transmits the identification information on the first RNA in a Packet Data Convergence Protocol (PDCP) Control Packet Data Unit (PDU).

6. The user equipment according to claim 2, wherein the receiver, when receiving the user equipment related context information from the second radio base station, receives the user equipment related context information with a fourth message of the random access channel procedure.

7. The user equipment according to claim 3, wherein the receiver, when receiving the user equipment related context information from the second radio base station, receives the user equipment related context information with a second message of the random access channel procedure.

8. The user equipment according to claim 1, wherein the receiver, when in operation, receives from the second radio base station identification information of the second RNA, and
   wherein the processing circuitry, when determining whether the user equipment moves to the second RNA, determines that the user equipment moves to the second RNA in case the identification information of the first RNA is different from the identification information of the second RNA.

9. The user equipment according to claim 1, wherein the processing circuitry, when determining that the user equipment is moving to the second RNA, transitions the user equipment from the inactive state to the connected state.

10. The user equipment according to claim 1, wherein the user equipment related context information comprises at least one of the following:
    security information usable between the second radio base station and the user equipment, including one or both of a ciphering key to cipher data before transmission and a deciphering key to decipher data after reception; and
    information on data connections at least between the second radio base station and the user equipment.

11. The user equipment according to claim 1, wherein the transmitter, when transmitting the identification information on the first RNA to the second radio base station, also transmits to the second radio base station identification information of user equipment related first context information used by the user equipment to exchange data with the first radio base station of the first RNA, the identification information of user equipment related first context information is usable by the second radio base station to obtain the user equipment related first context information for the first RNA, and/or
    wherein the identifier of the user equipment is usable by the second radio base station to contact the core network entity to update the user equipment related context information in the core network entity.

12. The user equipment according to claim 1, wherein the receiver, when in operation, receives from the second radio base station a new user identification valid for the second RNA.

13. The user equipment according to claim 1, wherein the user equipment and the second radio base station support the new radio (NR) technology of the $5^{th}$ Generation (5G) of the 3GPP ($3^{rd}$ Generation Partnership Project).

14. The user equipment according to claim 1, wherein the transmitter, when in operation, transmits user data to the second radio base station using the received user equipment related context information, and/or
the receiver, when in operation, receives user data from the second radio base station based on the received user equipment related context information.

15. The user equipment according to claim 1, wherein the identifier of the user equipment is a Radio Network Temporary Identifier (RNTI) allocated by the first radio base station of the first RNA.

16. The user equipment according to claim 1, wherein the core network entity comprises a Mobility Management Entity (MME).

17. A method executed by a user equipment (UE) in a mobile communication system, the method comprising:
determining whether the user equipment, being located in a first radio access network notification area (first RNA) is moving to a second radio access network notification area (second RNA) different from the first RNA, the user equipment being in an inactive state out of an idle state, a connected state and the inactive state the user equipment can be in;
transmitting identification information on the first RNA to a second radio base station of the second RNA, when determining that the user equipment is moving to the second RNA, wherein the identification information on the first RNA comprises an identifier of the user equipment allocated by a first radio base station of the first RNA;
receiving from the second radio base station user equipment related context information usable by the user equipment to exchange uplink and downlink data with the second radio base station, new UE identification allocated by the second radio base station, an acknowledgement (ACK), and grant of uplink radio resources; and
to update the user equipment related context information in a core network entity that is responsible for the user equipment, transmitting a path switch request message including the user equipment related context information directly to the core network entity.

18. The method according to claim 17, wherein the identifier of the user equipment is a Radio Network Temporary Identifier (RNTI) allocated by the first radio base station of the first RNA.

19. The method according to claim 17, wherein the core network entity comprises a Mobility Management Entity (MME).

* * * * *